(12) United States Patent
Gordon

(10) Patent No.: US 12,060,931 B2
(45) Date of Patent: Aug. 13, 2024

(54) AIR-COOLED CVT CLUTCH ASSEMBLY

(71) Applicant: Robby Gordon, Charlotte, NC (US)

(72) Inventor: Robby Gordon, Charlotte, NC (US)

( * ) Notice: Subject to any disclaimer, the term of this patent is extended or adjusted under 35 U.S.C. 154(b) by 159 days.

(21) Appl. No.: 17/739,988

(22) Filed: May 9, 2022

(65) Prior Publication Data

US 2022/0356940 A1 Nov. 10, 2022

Related U.S. Application Data

(60) Provisional application No. 63/186,535, filed on May 10, 2021.

(51) Int. Cl.
*F16H 57/04* (2010.01)

(52) U.S. Cl.
CPC ..... *F16H 57/0416* (2013.01); *F16H 57/0473* (2013.01); *F16H 57/0489* (2013.01)

(58) Field of Classification Search
CPC ............. F16H 57/0416; F16H 57/0473; F16H 57/0489
USPC .......................................................... 474/93
See application file for complete search history.

(56) References Cited

U.S. PATENT DOCUMENTS

| | | | | |
|---|---|---|---|---|
| 4,493,677 A * | 1/1985 | Ikenoya | ................... | F02B 61/02 |
| | | | | 474/93 |
| 4,671,782 A * | 6/1987 | Ochiai | ................ | F16H 57/0415 |
| | | | | 474/93 |
| 7,070,527 B1 * | 7/2006 | Saagge | ................... | F16H 55/56 |
| | | | | 474/93 |
| 2004/0013526 A1 * | 1/2004 | Nilson | .................. | F04D 29/326 |
| | | | | 416/189 |
| 2004/0224806 A1 * | 11/2004 | Chonan | ............... | F16H 57/0415 |
| | | | | 474/93 |
| 2009/0298627 A1 * | 12/2009 | Johnson | .................... | F16H 9/18 |
| | | | | 474/93 |
| 2018/0245682 A1 * | 8/2018 | Davis | .................... | F16H 57/035 |
| 2018/0306309 A1 * | 10/2018 | Steinert | ............... | F16H 57/0489 |

\* cited by examiner

*Primary Examiner* — Gene O Crawford
*Assistant Examiner* — Emily R Kincaid
(74) *Attorney, Agent, or Firm* — Barry Choobin; Patent 360

(57) ABSTRACT

An apparatus and methods are provided for an air-cooled CVT clutch. The air-cooled CVT clutch includes a first cooling fan coupled with a primary clutch and a second cooling fan coupled with a secondary clutch. An outboard housing mates with an inboard housing to enclose the primary clutch and the secondary clutch. The first cooling fan is coupled to a moveable sheave comprising the primary clutch and configured to draw a cooling airstream through an air duct disposed in the outboard housing. The second cooling fan is coupled to a moveable sheave comprising the secondary clutch and configured to draw the cooling airstream from the primary clutch to the secondary clutch. The first cooling fan pushes the cooling airstream to the secondary clutch when the second clutch is not rotating.

10 Claims, 4 Drawing Sheets

AIR-COOLED CVT CLUTCH ASSEMBLY

PRIORITY

This application claims the benefit of and priority to U.S. Provisional Application, entitled "Air-Cooled CVT Clutch Assembly," filed on May 10, 2021, and having application Ser. No. 63/186,535, the entirety of said application being incorporated herein by reference.

FIELD

Embodiments of the present disclosure generally relate to off-road vehicle drivetrains. More specifically, embodiments of the disclosure relate to an apparatus and methods for a CVT clutch assembly that is air-cooled.

BACKGROUND

Off-road vehicles enjoy an enthusiastic following because of their many uses and versatility. As a result, several types of motorsports involve racing of various types of off-road vehicles. For example, competitions exist that are dedicated to various types of terrain, such as rally, desert racing, and rock-crawling. Besides their use in various motorsports, off-road vehicles commonly are used for sight-seeing and traveling to areas that may not be accessed by way of standard, paved roads.

Many recreational off-road vehicles, such as all-terrain vehicles (ATV's), utility vehicles, motorcycles, snowmobiles, and the like, include a continuously variable transmission (CVT). In general, a CVT is an automatic transmission that can change seamlessly through a continuous range of gear ratios, unlike conventional transmissions that provide a limited number of gear ratios in fixed steps.

One of the most common types of CVT includes a V-belt connected between two variable diameter pulleys. Each variable diameter pulleys includes two cone-shaped halves, or sheaves, that can be moved together and apart. Moving the two sheaves of a pulley closer together causes the V-belt to ride higher, or farther away from an axle of the pulley. As such, an effective diameter of the pulley is dependent on the distance between the two sheaves of the pulley. Further, by moving the sheaves of a first pulley closer together and the sheaves of a second pulley farther apart, the V-belt can be caused to ride higher on the first pulley and ride lower on the second pulley. Thus, a gear ratio between the first and second pulleys can be manipulated by adjusting the distance between the sheaves comprising the first and second pulleys.

Moreover, since the distance between the first and second pulleys as well as the length of the V-belt remain constant, the first and second pulleys must be adjusted simultaneously to maintain a suitable tension on the V-belt. In some cases, a simple CVT may include a centrifugal drive pulley and a spring-loaded driven pulley that uses belt tension to effect conforming adjustments in the driven pulley.

Given the popularity of off-road vehicles, there is a desire to improve the mechanical strength and performance of off-road drivetrain and suspension systems, while at the same reducing the mechanical complexity of such systems.

SUMMARY

An apparatus and a method are provided for an air-cooled CVT clutch. The air-cooled CVT clutch includes a first cooling fan that is coupled with a primary clutch and a second cooling fan that is coupled with a secondary clutch. An outboard housing is configured to mate with an inboard housing for the purpose of enclosing the primary clutch and the secondary clutch. The first cooling fan is coupled to a moveable sheave comprising the primary clutch and configured to draw a cooling airstream through an air duct disposed in the outboard housing. The second cooling fan is coupled to a moveable sheave comprising the secondary clutch and configured to draw the cooling airstream from the primary clutch to the secondary clutch. The first cooling fan may push the cooling airstream to the secondary clutch when the primary clutch is idling and the second clutch is not rotating.

In an exemplary embodiment, an air-cooled CVT clutch comprises: a first cooling fan coupled with a primary clutch; a second cooling fan coupled with a secondary clutch; and an outboard housing for enclosing the primary clutch and the secondary clutch.

In another exemplary embodiment, the first cooling fan is coupled to a moveable sheave comprising the primary clutch and configured to draw a cooling airstream through an air duct disposed in the outboard housing. In another exemplary embodiment, the first cooling fan includes a mounting ring for attaching the first cooling fan to the moveable sheave. In another exemplary embodiment, the first cooling fan includes a series of blades disposed between an inner ring and an outer ring. In another exemplary embodiment, the inner ring and the outer ring are configured to support the series of blades disposed uniformly around a circumference of the inner ring and the outer ring. In another exemplary embodiment, the blades are configured to draw the cooling airstream through the air duct into the outboard housing during rotation of the primary clutch.

In another exemplary embodiment, a stationary sheave comprising the primary clutch includes an inboard cooling fan that serves to cause air-cooling of the stationary sheave. In another exemplary embodiment, the inboard cooling fan includes a series of curved blade portions that are incorporated into the material comprising the stationary sheave. In another exemplary embodiment, the curved blade portions may be machined or fabricated out of the material comprising the stationary sheave.

In another exemplary embodiment, the second cooling fan is coupled to a moveable sheave comprising the secondary clutch and configured to cause the cooling airstream to be drawn onto the secondary clutch. In another exemplary embodiment, the second cooling fan includes a multiplicity of blades that are arranged between an outer ring and an inner ring and are uniformly disposed around a circumference of the outboard cooling fan. In another exemplary embodiment, the multiplicity of blades are configured to draw the cooling airstream through from the primary clutch onto the secondary clutch.

In another exemplary embodiment, the outboard housing is configured to mate with an inboard housing for the purpose of enclosing the primary clutch and the secondary clutch. In another exemplary embodiment, the outboard housing includes a primary clutch chamber and a secondary clutch chamber that are configured to partially enclosed the primary clutch and the secondary clutch. In another exemplary embodiment, the primary clutch chamber includes an air duct configured to allow a cooling airstream to be drawn into the primary clutch chamber by the first cooling fan when the primary clutch is rotating. In another exemplary embodiment, an air passage extends along the bottom of the outboard housing from the primary clutch chamber to the second clutch chamber. In another exemplary embodiment, the air passage is configured to allow a cooling airstream to be drawn from the primary clutch chamber into the secondary clutch chamber by the second cooling fan when the secondary clutch is rotating. In another exemplary embodiment, the air passage is configured to allow the cooling airstream to be pushed through into the secondary clutch chamber by the first cooling fan when the primary clutch is idling and the second clutch is not rotating.

In an exemplary embodiment, a method for an air-cooled CVT clutch comprises: coupling a first cooling fan with a primary clutch; coupling a second cooling fan with a secondary clutch; and enclosing the primary clutch and the secondary clutch by way of an outboard housing.

In another exemplary embodiment, enclosing includes mating the outboard housing with an inboard housing and including an air duct to allow a cooling airstream to be drawn through the outboard housing and the inboard housing.

These and other features of the concepts provided herein may be better understood with reference to the drawings, description, and appended claims.

BRIEF DESCRIPTION OF THE DRAWINGS

The drawings refer to embodiments of the present disclosure in which.

Figure 1:
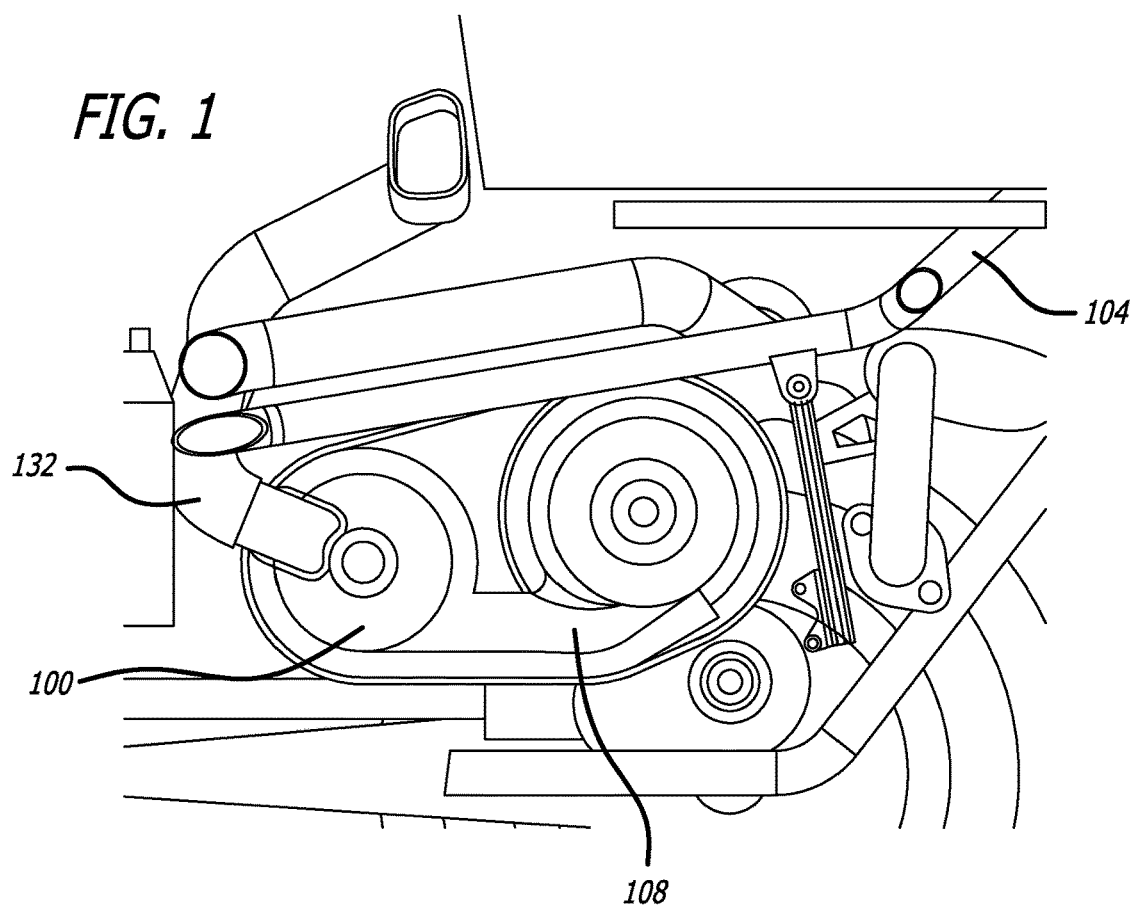
FIG. 1 illustrates a side plan view of an exemplary embodiment of an air-cooled CVT clutch that is incorporated into an off-road vehicle, according to the present disclosure.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the air-cooled CVT clutch and methods disclosed herein may be practiced without these specific details. In other instances, specific numeric references such as "first sheave," may be made. However, the specific numeric reference should not be interpreted as a literal sequential order but rather interpreted that the "first sheave" is different than a "second sheave." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

Many recreational off-road vehicles, such as all-terrain vehicles (ATV's), include a continuously variable transmission (CVT). One common type of CVT includes a V-belt connected between two variable diameter pulleys. A gear ratio between the two pulleys can be manipulated by adjusting the separation between two sheaves comprising each of the pulleys. Since the distance between the two pulleys as well as the length of the V-belt remain constant, the two pulleys must be adjusted simultaneously to maintain a suitable tension on the V-belt. Embodiments disclosed herein provide an apparatus and methods for a CVT clutch assembly that includes air-cooling.

Figure 2:
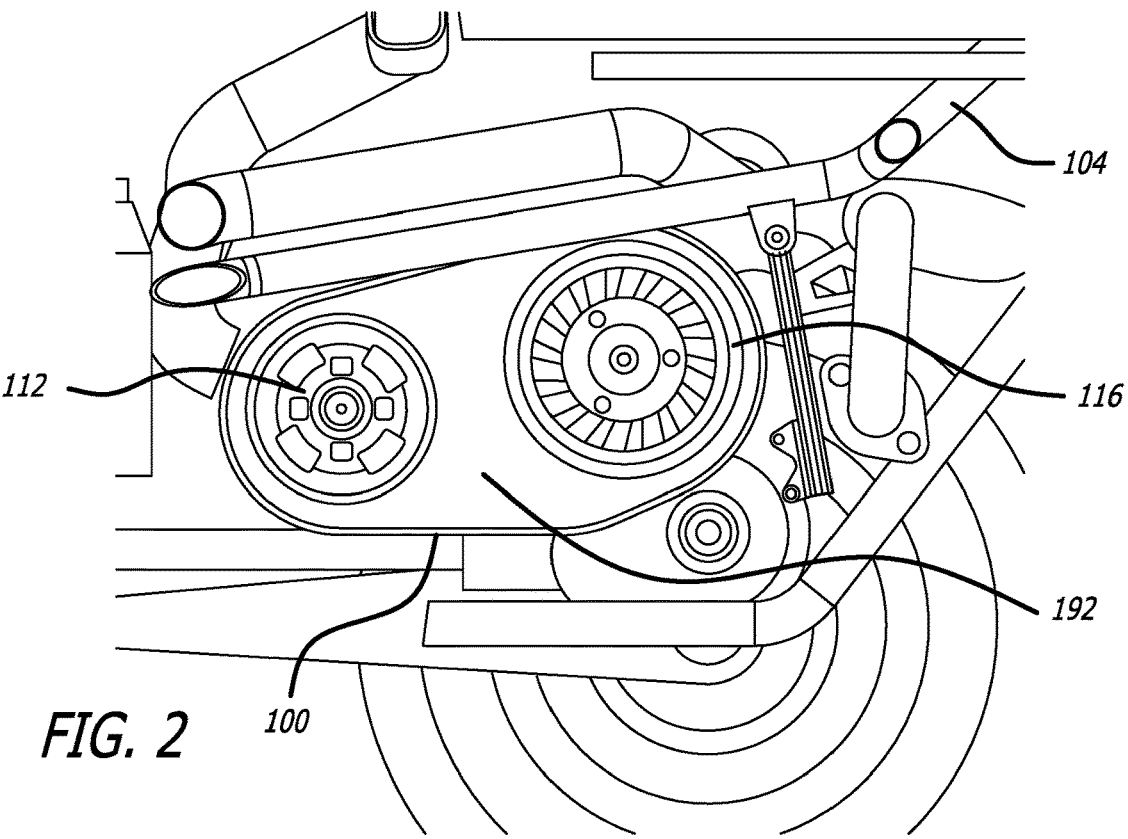
FIG. 2 illustrates a side plan view of the air-cooled CVT clutch of FIG. 1 with an outboard housing remove to reveal a primary CVT clutch and a secondary CVT clutch.

FIG. 1 illustrates a side plan view of an exemplary embodiment of an air-cooled CVT clutch 100 that is incorporated into an off-road vehicle 104, according to the present disclosure. The air-cooled CVT clutch 100 includes an outboard housing 108 that encloses a primary CVT clutch 112 and a second CVT clutch 116, as shown in FIG. 2. The primary CVT clutch 112 is attached to an engine of the vehicle 104 and joined to the secondary CVT clutch 116 by way of a belt (not shown). The belt may of a V-belt variety or any other variety of belt that is suitable for use in the air-cooled CVT clutch 100. The secondary CVT clutch 116 is attached to a transmission, transaxle, or drivetrain of the vehicle 104. When the engine applies a suitable torque, the primary CVT clutch 112 turns the secondary CVT clutch 116 by way of the belt.

Figure 3:
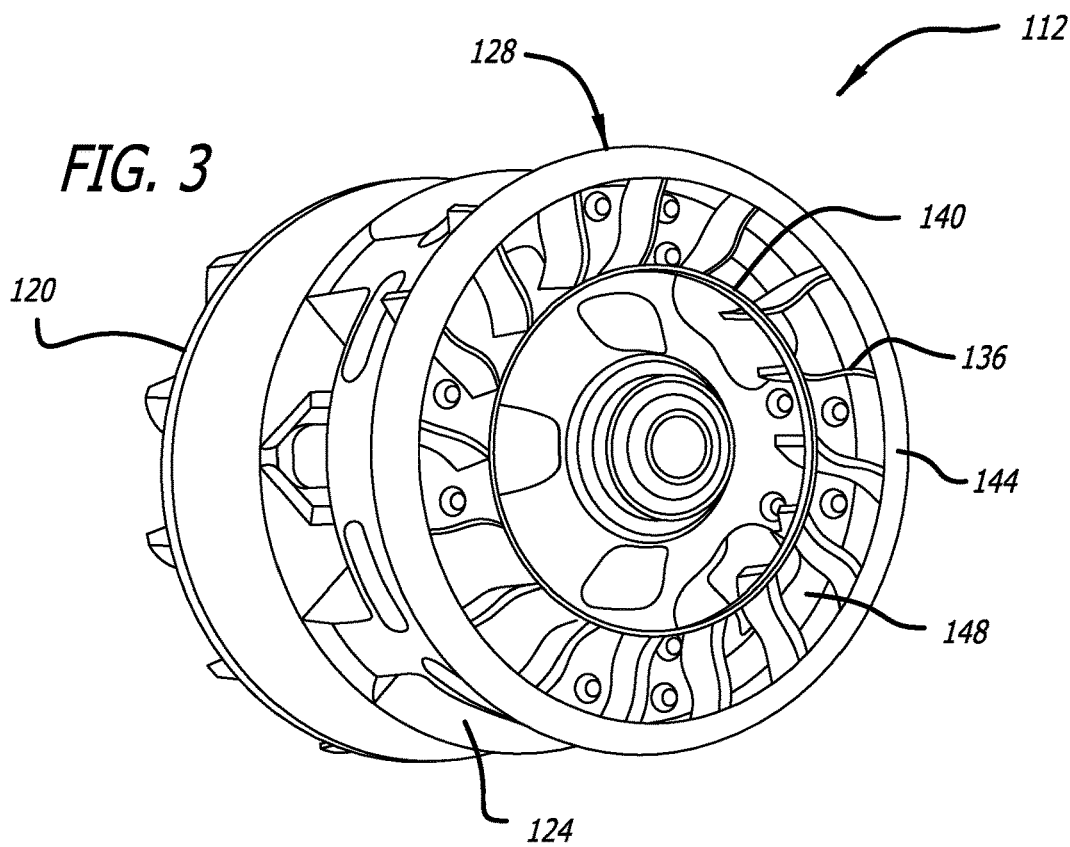
FIG. 3 illustrates an outboard isometric view of an exemplary embodiment of a primary CVT clutch that may be incorporated into an air-cooled CVT clutch according to the present disclosure.

As shown in FIG. 3, the primary CVT clutch 112 (hereinafter "clutch 112") may be of a centrifugal clutch variety that is mounted to an output end of an engine crankshaft. The clutch 112 generally includes a fixed, stationary sheave 120 and a moveable sheave 124 that can be moved toward the stationary sheave 120 to engage the belt. When engine speed increases, the clutch 112 pushes the moveable sheave 124 toward the stationary sheave 120, thus narrowing the spacing between the stationary sheave 120 and the moveable sheave 124. The narrow spacing causes the belt to rotate and turn the secondary CVT clutch 116 (hereinafter "secondary clutch 116"). While at idle speeds, however, the moveable sheave 124 is moved away from the stationary sheave 120, thus allowing the belt to sit between the stationary sheave 120 and the moveable sheave 124 without being driven. The spacing between the stationary sheave 120 and the moveable sheave 124 provides a "neutral" position that allows the engine to idle without transmitting power to the drivetrain of the vehicle 104.

With continuing reference to FIG. 3, an outboard cooling fan 128 is coupled to the moveable sheave 124 and configured to draw a cooling airstream through an air duct 132 (see FIG. 1) onto the clutch 112. The outboard fan 128 includes a series of blades 136 disposed between an inner ring 140 and an outer ring 144. Further, a mounting ring 148 provides a means for attaching the outboard cooling fan 128 to the moveable sheave 124. As will be appreciated, the rings 140, 144 serve to support the blades 136 uniformly disposed around the circumference of the rings 140, 144. In general, the blades 136 are configured to draw the cooling airstream through the air duct 132 (FIG. 1) into the outboard housing 108 during rotation of the clutch 112. The blades 136 may be any of backward curved blades, backward inclined blades, backward inclined airfoil blades, radial blades, forward curved blades, or any combination thereof, without limitation.

Figure 4:
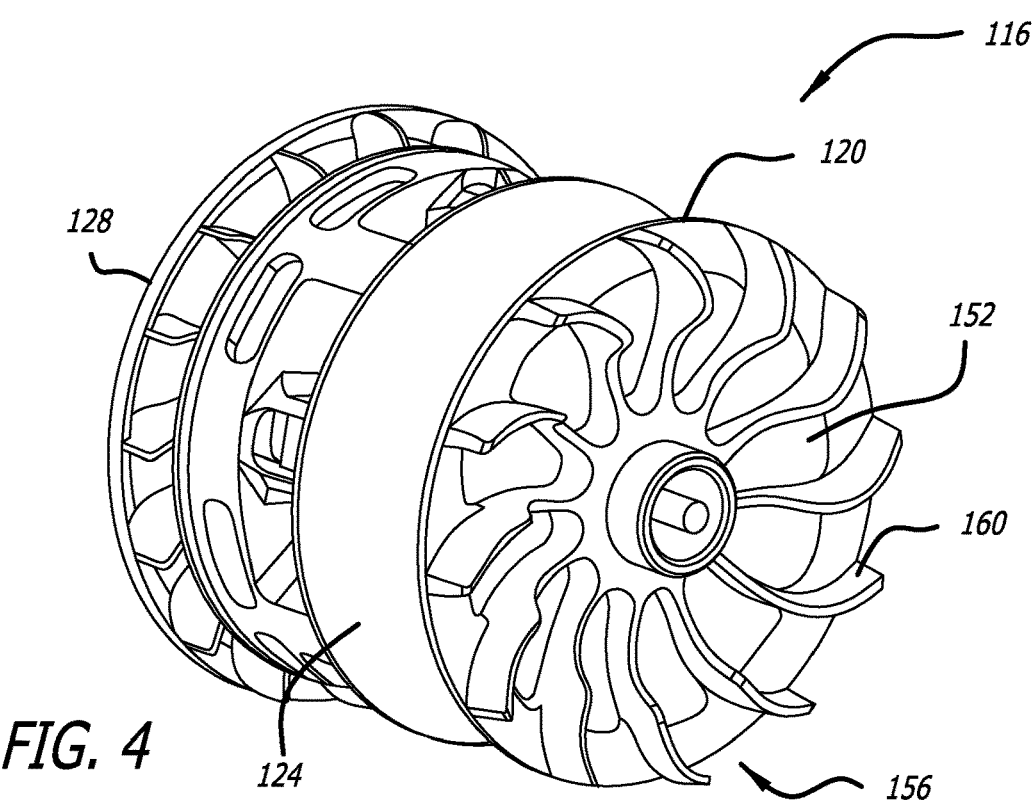
FIG. 4 illustrates an inboard isometric view of the primary CVT clutch of FIG. 3.

FIG. 4 illustrates an inboard isometric view of embodiment of the clutch 112 shown in FIG. 3. In the illustrated embodiment, an inboard surface 152 of the stationary sheave 120 includes an inboard cooling fan 156 that serves to cause air-cooling of the stationary sheave 120. The inboard cooling fan 152 includes a series of curved blade portions 160 that are incorporated into the material comprising the stationary sheave 120. It is contemplated that the curved blade portion 160 may be machined or fabricated out of the material comprising the stationary sheave 120. The curved blade portion 160 may be any of backward curved blades, backward inclined blades, backward inclined airfoil blades, radial blades, forward curved blades, or any combination thereof, without limitation.

Figure 5:
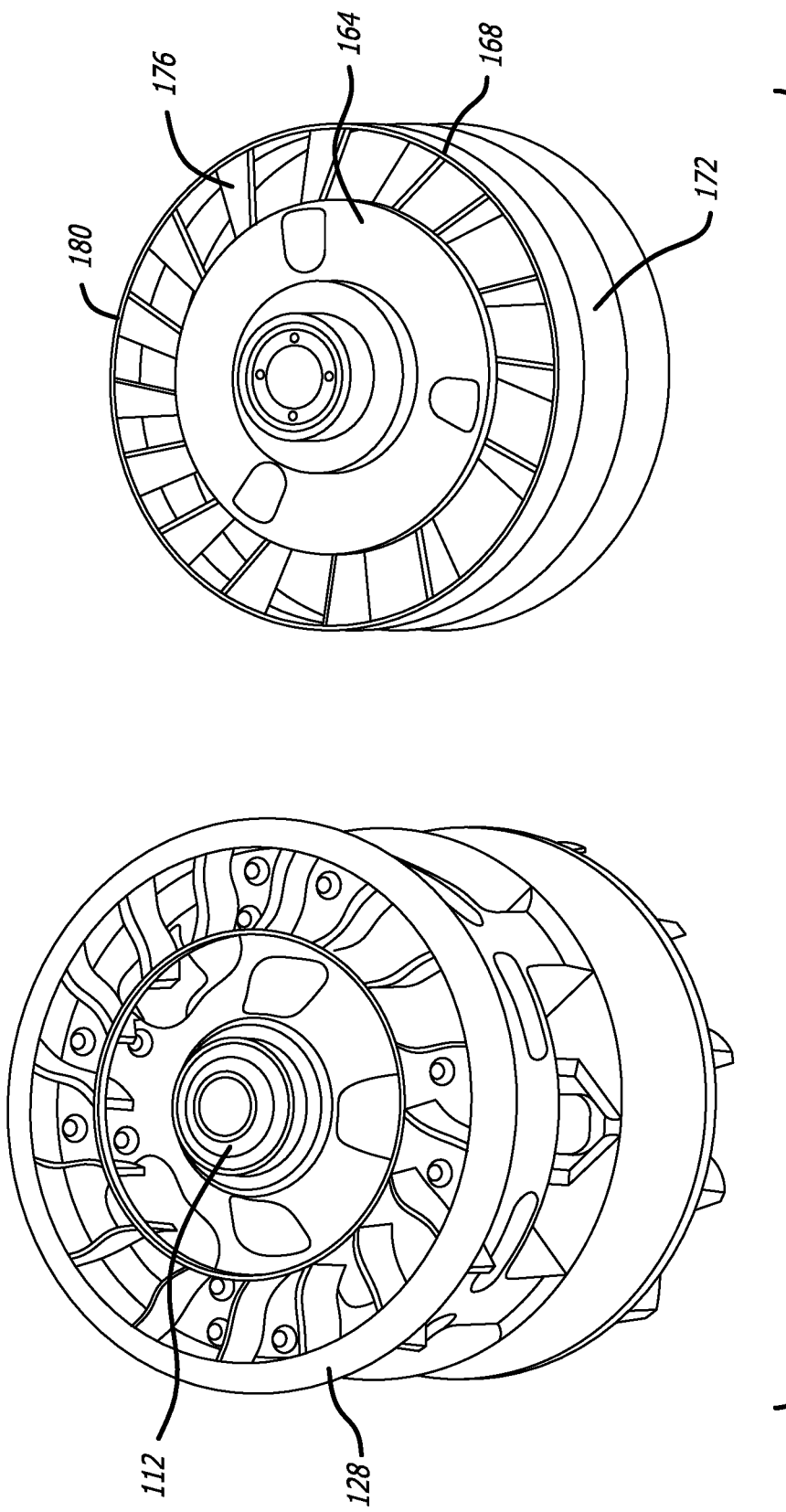
FIG. 5 illustrates a perspective view of exemplary embodiments of a primary CVT clutch and a secondary CVT clutch that may be incorporated into an air-cooled CVT clutch in accordance with the present disclosure.

FIG. 5 illustrates an exemplary embodiment of the clutch 112 of FIG. 3, including the outboard cooling fan 128, and an exemplary embodiment of a secondary CVT clutch 164 that may be incorporated into an air-cooled CVT clutch 100 in accordance with the present disclosure. As shown, the secondary clutch 164 includes an outboard cooling fan 168 that is coupled with a moveable sheave 172 of the secondary clutch 164. As will be appreciated, the outboard cooling fan 168 is configured to cause the cooling airstream to be drawn onto the secondary clutch 164. The outboard cooling fan 168 includes a multiplicity of blades 176 that are arranged between an outer ring 180 and an inner ring (not shown) and uniformly disposed around the circumference of the outboard cooling fan 168. The blades 176 may be any of backward curved blades, backward inclined blades, backward inclined airfoil blades, radial blades, forward curved blades, or any combination thereof, without limitation.

Figure 6:
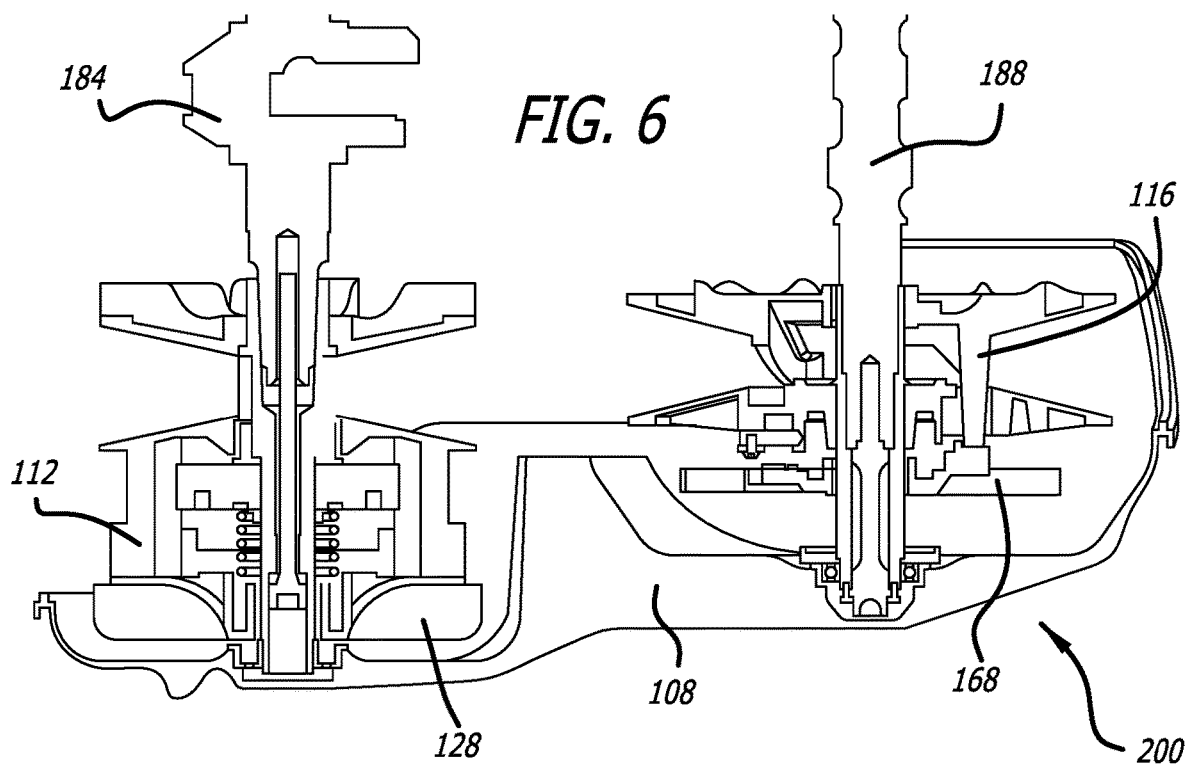
FIG. 6 illustrates a cross-sectional view of the air-cooled CVT clutch of FIG. 1, taken along a midline.

FIG. 6 illustrates a cross-sectional view of the air-cooled CVT clutch 100 of FIG. 1, taken along a midline. As shown in FIG. 6, the primary CVT clutch 112 may be fastened onto an engine crankshaft 184 while the secondary CVT clutch 116 may be attached to a transaxle gear shaft 188. Further, the air-cooled CVT clutch 100 may be enclosed between the outboard housing 108 and an inboard housing 192 (see FIG. 2). The outboard fan 128 may be disposed between the primary CVT clutch 112 and an interior surface of the outboard housing 108, and the outboard cooling fan 168 may be disposed between the secondary CVT clutch 116 and the interior surface of the outboard housing 108.

Figure 7:
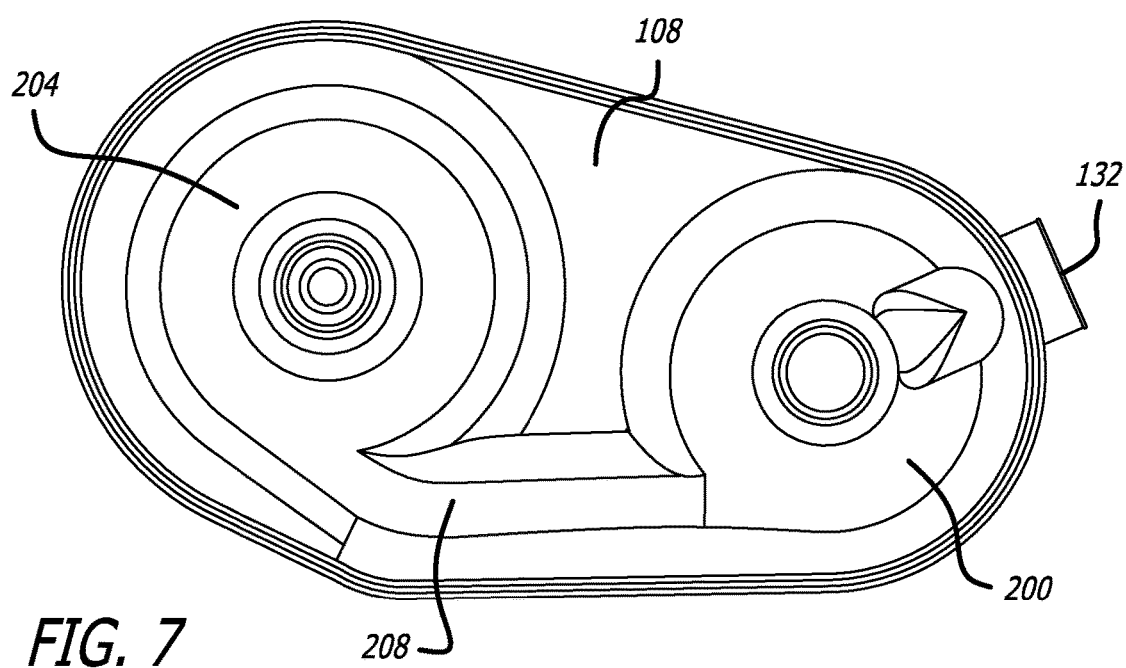
FIG. 7 illustrates an inboard side plan view of an exemplary embodiment of an outboard housing that may enclose and provide an airstream to an air-cooled CVT clutch according to the present disclosure.

FIG. 7 illustrates an inboard side view of an exemplary embodiment of an outboard housing 108 that may be used to enclose the air-cooled CVT clutch 100 according to the present disclosure. The outboard housing 108 is configured to mate with an inboard housing 192 (see FIG. 2) for the purpose of enclosing the air-cooled CVT clutch 100. The outboard housing 108 may be made of any suitably rigid material, such as molded plastic, aluminum, or other similar material. The outboard housing 108 includes a primary clutch chamber 200 and a secondary clutch chamber 204. The clutch chambers 200, 204 are configured to partially enclosed the clutches 112, 116 when the outboard housing 108 is coupled with the inboard housing 192 (see FIG. 2). An air duct 132 is disposed in the primary clutch chamber 200. The air duct 132 allows a cooling airstream to be drawn into the primary clutch chamber 200 by the outboard cooling fan 128 when the primary CVT clutch 112 is rotating.

As shown in FIG. 7, the outboard housing 108 includes an air passage 208 that extends along the bottom of the outboard housing 108 from the primary clutch chamber 200 to the second clutch chamber 204. The air passage 208 allows a cooling airstream to be drawn from the primary clutch chamber 200 into the secondary clutch chamber 204 by the outboard cooling fan 168 when the secondary CVT clutch 116 is rotating. It is contemplated, however, that the cooling airstream may be pushed through the air passage 208 by the outboard cooling fan 128 when the primary CVT clutch 112 is idling and the second CVT clutch 116 is not rotating. It is further contemplated that an air duct or other form of opening may be disposed in the inboard housing 192 (see FIG. 2) so as to allow the cooling airstream to exit the secondary clutch chamber 204, thereby removing heat from the air-cooled CVT clutch 100, as desired.

While the air-cooled CVT clutch and methods have been described in terms of particular variations and illustrative figures, those of ordinary skill in the art will recognize that the air-cooled CVT clutch is not limited to the variations or figures described. In addition, where methods and steps described above indicate certain events occurring in certain order, those of ordinary skill in the art will recognize that the ordering of certain steps may be modified and that such modifications are in accordance with the variations of the air-cooled CVT clutch. Additionally, certain of the steps may be performed concurrently in a parallel process, when possible, as well as performed sequentially as described above. To the extent there are variations of the air-cooled CVT clutch, which are within the spirit of the disclosure or equivalent to the air-cooled CVT clutch found in the claims, it is the intent that this patent will cover those variations as well. Therefore, the present disclosure is to be understood as not limited by the specific embodiments described herein, but only by scope of the appended claims.

What is claimed is:

1. An air-cooled CVT clutch, comprising:
a primary clutch of centrifugal type configured to mount to an output end of an engine crankshaft, the primary clutch comprises a stationary sheave and a moveable sheave, wherein the moveable sheave is configured to move towards the stationary sheave to engage a V-belt, resulting in rotation of the V-belt;
a first cooling fan coupled to the moveable sheave of the primary clutch;
a second cooling fan coupled with a secondary clutch; and
an outboard housing for enclosing the primary clutch and the secondary clutch, the outboard housing includes a primary clutch chamber configured to encase the primary clutch and a secondary clutch chamber configured to encase the secondary clutch, wherein the primary clutch chamber comprises an air duct configured to allow a cooling airstream to be drawn into the primary clutch chamber by the first cooling fan, wherein an air passage extends along a bottom of the outboard housing from the primary clutch chamber to the second clutch chamber, wherein the air passage is configured to allow the cooling airstream to be pushed through into the secondary clutch chamber by the first cooling fan when the primary clutch is idling and the secondary clutch is not rotating, wherein the second fan is configured to cause the cooling airstream to be drawn onto the secondary clutch.

2. The air-cooled CVT clutch of claim 1, wherein the first cooling fan is configured to draw a cooling airstream through the air duct disposed in the outboard housing.

3. The air-cooled CVT clutch of claim 2, wherein the first cooling fan includes a mounting ring for attaching the first cooling fan to the moveable sheave.

4. The air-cooled CVT clutch of claim 2, wherein the first cooling fan includes a series of blades disposed between an inner ring and an outer ring.

5. The air-cooled CVT clutch of claim 4, wherein the inner ring and the outer ring are configured to support the series of blades disposed uniformly around a circumference of the inner ring and the outer ring.

6. The air-cooled CVT clutch of claim 4, wherein the series of blades are configured to draw the cooling airstream through the air duct into the outboard housing during rotation of the primary clutch.

7. The air-cooled CVT clutch of claim 6, wherein the series of blades of the first cooling fan are incorporated into a material of the stationary sheave of the primary clutch.

8. The air-cooled CVT clutch of claim 7, wherein the second cooling fan comprises a multiplicity of blades that are arranged between an outer ring and an inner ring of the second cooling fan, wherein the multiplicity of blades of the second fan are uniformly disposed around a circumference of the second cooling fan.

9. The air-cooled CVT clutch of claim 1, wherein the outboard housing is configured to mate with an inboard housing for the purpose of enclosing the primary clutch and the secondary clutch.

10. A method for an air-cooled CVT clutch, comprising:
coupling a first cooling fan to a moveable sheave of a primary clutch, wherein the primary clutch is of centrifugal type and configured to mount to an output end of an engine crankshaft, the primary clutch comprises a stationary sheave and the moveable sheave, wherein the moveable sheave is configured to move towards the stationary sheave to engage a V-belt, resulting in rotation of the V-belt;
coupling a second cooling fan to a secondary clutch; and
enclosing the primary clutch and the secondary clutch by way of an outboard housing, wherein the outboard housing includes a primary clutch chamber configured to encase the primary clutch and a secondary clutch chamber configured to encase the secondary clutch, wherein the primary clutch chamber comprises an air duct configured to allow a cooling airstream to be drawn into the primary clutch chamber by the first cooling fan, wherein an air passage extends along a bottom of the outboard housing from the primary clutch chamber to the second clutch chamber, wherein the air passage is configured to allow the cooling airstream to be pushed through into the secondary clutch chamber by the first cooling fan when the primary clutch is idling and the secondary clutch is not rotating, wherein the second fan is configured to cause the cooling airstream to be drawn onto the secondary clutch.

\* \* \* \* \*